UNITED STATES PATENT OFFICE.

HORACE WILLIAMS AND JOHN L. ALBERGER, OF BUFFALO, N. Y.

PROCESS OF MANUFACTURING CRYSTALLIZABLE GRAPE-SUGAR.

SPECIFICATION forming part of Letters Patent No. 241,903, dated May 24, 1881.

Application filed October 28, 1880. (No specimens.)

*To all whom it may concern:*

Be it known that we, HORACE WILLIAMS and JOHN L. ALBERGER, of Buffalo, in the county of Erie and State of New York, have jointly invented a new and Improved Process of Manufacturing Crystallizable Grape-Sugar from Corn or other Cereals, of which the following is a description in such full, clear, concise, and exact terms as to enable any one skilled in the arts to which it appertains, or with which it is most nearly connected, to work or practice the same.

Our invention consists of the following process of manufacturing crystallizable grape-sugar from corn or starch:

First, we take starch, or soluble dextrine made of starch or grain, and treat it in a vessel of suitable construction, under the action of steam, in a solution of acid and water strong enough to convert the starch into dextrine and the dextrine into sirup or sugar-liquor, the treatment to be continued until the conversion is perfected, to be ascertained by the usual test. The solution should be composed of forty pounds of starch, three-fourths of a pound of acid, and twenty gallons of water.

Second, after thus converting the starch and dextrine into sirup, as aforesaid, we neutralize the acid with alkali or any of the well-known neutralizing agents for this purpose, then separate the neutralizing agent by filtering in the usual way, then decolorize the sirup with bone-black, filtering, or by any other means known to the art, and then boil the sirup in a vacuum-pan to 33° or 35° Beaumé with a temperature of 120° Fahrenheit. To neutralize the acid in the sirup about two per cent. of alkali should be used.

Third, the sirup having been thus purified, decolorized, and reduced, it is drawn into a receiver of suitable construction, where we allow it to cool to the ordinary temperature of the atmosphere, taking care not to freeze it. We then proceed to induce crystallization. This is done by rapidly mixing into the sirup a small percentage—say one per cent.—of finely-powdered grape-sugar, by which there are furnished granules for the crystals to form upon. Now by allowing the mass to stand quietly for ten or twelve hours the sugar will crystallize throughout, leaving the mother-liquor free in the receiver.

Fourth, the sugar having crystallized, as aforesaid, we put the crytallized sugar together into a mixer of any suitable construction and mix with it from five to ten per cent. of water reduced to 32° of Fahrenheit, or as near to that as possible, the object of this cold-water treatment being to wash the crystals without melting them, after which we place the crystallized sugar, liquor, and water in bags or sacks and expel the water and liquor by means of a hydraulic press, leaving within the sacks a pure hard sugar, which may be remelted and worked, or cast in blocks or cakes, or ground and pulverized.

In this process, if any of the starch or dextrine be left unconverted in any of its steps, the unconverted starch or dextrine will be carried off with the mother-liquor, leaving the sugar pure, and the starch or gum may be again boiled with acid and the sugar extracted, as before stated.

The sugar produced by this process is of great value in the arts, in which it has a wide range of use, such as sweetening wines, cider, &c., and for making ales or spirituous liquor, and for sweetening table-fruits, &c., the sugar of this process being perfectly pure and free from the usual flavors that characterize the grape-sugar by the processes now in use.

Having thus described our process, we claim and desire to secure by Letters Patent—

The process, substantially herein described, of manufacturing and crystallizing grape-sugar from corn or cereals, consisting of converting the starch and dextrine into sirup in a solution of acid and water under steam-heat, then neutralizing the acid, separating the neutralizing residuum, filtering, bone-blacking, decolorizing, and reducing in a vacuum-pan by the usual methods, then cooling the reduced or concentrated sirup, then adding a small percentage of powdered grape-sugar and pressing out the mother-liquor, substantially as described.

HORACE WILLIAMS.
JOHN L. ALBERGER.

Witnesses:
F. S. MILLER, Jr.,
C. Y. SELLECK.